Patented Nov. 19, 1940

2,222,225

UNITED STATES PATENT OFFICE 2,222,225

METHOD OF AND COMPOSITIONS FOR INFLUENCING THE GROWTH OF PLANTS

Arthur George Green, Walton-on-Thames, England

No Drawing. Application January 29, 1940, Serial No. 316,215. In Great Britain October 31, 1938

21 Claims. (Cl. 47—58)

This invention relates to improvements in the process of stimulating the growth of plants that is disclosed in United States application Serial No. 183,124, filed January 3, 1938 by Dr. Josef Sellei, now Patent No. 2,190,890, and is based on the discovery by Dr. Sellei that under some conditions fluorescent compounds stimulate the growth of plants, although the compounds themselves are not plant foods in the usual sense of the word.

The aforementioned application teaches that alkali salts of fluorescein when applied to the soil in very low concentrations may act as growth stimulants, and this action has been correlated with the fluorescence of these substances. An object of the present invention is to provide a suitable dosage. Thus if the concentration of the fluorescent material in the soil is too high, it may act injuriously and depress growth; on the other hand, an excessive alkalinity of the soil, or an unusually heavy rainfall may cause such a rapid dispersal of the material that no appreciable effect can be expected.

Another object of the present invention is to provide a method of liberating active fluorescent compounds in the soil in soluble form but in such low concentration as to be harmless to the cell structures of the plant.

Another object of the invention is to provide a simple and practicable way of supplying fluorescent materials to growing plants in concentrations capable of stimulating their growth.

A more specific object is to provide preparations which may be applied to the soil in relatively large quantities without injury to the plants, and which will supply to the plants requisite quantities of growth-stimulating fluorescent materials over a long period of time.

In accordance with the present invention, I achieve the foregoing objects by applying to the soil insoluble compounds of fluorescent dyestuffs with suitable inorganic or organic bases. Such compounds have the advantages (1) of being insoluble, or sparingly soluble, and having little or no fluorescence so that they can be applied to the soil in a concentrated condition without fear of injurious action; (2) of being slowly dissociated by water so that they give off the desired soluble and active fluorescent substance at a desired low concentration. In a sense, such compounds form a depot in the soil from which the desired fluorescent material is slowly liberated.

As a result of the slight solubility of the material, one, or, at most two, relatively heavy applications suffice in place of numerous small applications of the corresponding soluble salts, and the danger of rapid dispersal by rain is minimized.

Of the relatively insoluble inorganic salts of fluorescein and allied fluorescent dyestuffs of the pyrone series, the most suitable appear to be the ferric and cupric compounds, which are obtainable as precipitates by the interaction of ferric or cupric salts, such as chlorides or sulphates, with solutions of the alkali salts of pyrone dyestuffs. The ferrous salts are unsuitable because they are more soluble.

Fluorescein and allied fluorescent dyestuffs of the pyrone series form insoluble salts with a great variety of organic bases, such as amines, diamines, etc. The most suitable organic bases appear to be benzidine or tolidine. The desired insoluble compounds of the fluorescent material may be precipitated from aqueous solutions of the soluble salts, such as the sodium salts of the fluorescent compounds by the addition of a soluble salt of the amino base, such as the hydrochloride.

Further advantage may result by employing as the base for the insoluble compounds a base which itself gives fluorescent salts, such as the bases of auramines, acridines, or rhodamines. Hydrolysis of the resultant insoluble compounds in the soil then results in the liberation of both a fluorescent acid and a fluorescent base.

In some instances, an especially insoluble compound may be obtained by the combination of a fluorescent acid with an organic base and an inorganic salt. Thus a solution of sodium fluoresceinate gives little or no precipitate on the addition of methylene blue but upon adding ferric chloride to the mixture, complete precipitation of a double salt occurs. Sodium salt of dibromo fluorescein gives only a partial precipitation with rhodamine B but the precipitation becomes complete when ferric chloride is added.

The precipitated insoluble compound obtained by the above methods may be applied to the soil in the form of suspensions in water, or as dry powders or pastes. It may also be incorporated with inert materials or fertilizers provided that they are not alkaline. Furthermore, the precipitation of the insoluble compounds may be effected in the presence of an inert material or in a fertilizer, or in the soil itself.

Following are specific examples of typical preparations and the methods by which they may be produced.

*Example I.*—5 parts of fluorescein and 5 parts of sodium bicarbonate are boiled with 1000 parts of water until dissolved and to the cold solution is added a solution containing 30 parts of ferric ammonium sulphate (ferric alum) in 500 parts of water. The chocolate-brown precipitate of the ferric salt produced may be filtered off and dried or the suspension suitably diluted may be used for direct application to the soil.

If in place of the ferric alum there is added to the same volume of the fluorescein solution a solution containing 5 parts of cupric sulphate an orange-brown precipitate of the copper salt is produced and the fluorescence disappears. When manganous chloride or nickelous chloride is employed the corresponding salts are produced as orange-yellow precipitates when the solutions are boiled.

*Example II.*—A cold solution of 5 parts of ferric alum 0.005 parts of cupric sulphate and 0.005 parts of manganous chloride in 50 parts of water is added cold to a solution of 1 part of fluorescein and 1 part of sodium bicarbonate in 50 parts of water. The suspension is then mixed with 900 parts of fine dry sand or sandy soil, giving a damp powder containing 1 per 1000 of fluorescein as ferric, manganous and copper salts.

*Example III.*—A cold solution of 10 parts of fluorescein and 10 parts of sodium bicarbonate in 500 parts of water is mixed with a solution of 30 parts of ferric chloride in 200 parts of water. The precipitate is filtered off and dried at low temperature. The product forms a chocolate powder insoluble in water.

*Example IV.*—A solution of 1 part of the dyestuff known as pyramine conc. of the I. G. Farbenindustrie, dissolved in 100 parts of water is mixed with an equal volume of a solution containing 1 part of ferric alum in 100 parts of water. The solution assumes a purple-brown color with greatly diminished fluorescence. Upon heating to boiling a brownish-yellow precipitate is formed with complete disappearance of the fluorescence.

*Example V.*—A solution of 10 parts of the sodium salt of fluorescein in 1000 parts of water is mixed with 1600 parts of a solution of benzidine hydrochloride containing 16 parts of benzidine base. An insoluble yellow precipitate of the benzidine fluoresceinate is thrown down. This may be filtered off or used as a suspension.

*Example VI.*—A solution of 10 parts of the sodium salt of fluorescein in 1000 parts of water is mixed with 30 parts of rhodamine 6GDN extra conc. dissolved in 3000 parts of water. A bright crimson-red precipitate is formed which becomes more insoluble upon addition of ferric chloride.

*Example VII.*—A 1% solution of sodium fluoresceinate is mixed with twice its volume of a 1% solution of auramine O. An orange-yellow precipitate of auramine fluoresceinate is obtained.

*Example VIII.*—A mixture is made of equal volumes of 1% solutions of sodium fluoresceinate, methylene blue (chloride, zinc free. col. Index No. 922) and ferric chloride. A dark moss-green precipitate of the double salt is thrown down, the filtrate becoming almost colorless.

*Example IX.*—A mixture is made of 100 parts of a 1% solution of sodium dibromo-fluoresceinate with 50 parts each of 1% solutions of methylene blue (chloride, zinc free. Col. Index No. 922) and ferric chloride. Complete precipitation occurs. A similar result is obtained by substituting rhodamine B extra conc. for methylene blue.

*Example X.*—A solution of 10 parts of pyramine conc. (I. G. Farbenindustrie) dissolved in 1000 parts of water, is mixed with 25 parts of methylene blue (chloride, zinc free. Col. Index No. 922) dissolved in 2500 parts of water. The product is a dark coppery blue precipitate.

If the methylene blue is replaced by 14 parts of auramine O, a yellow precipitate is obtained.

Other fluorescent dyestuffs of the pyrone series besides those mentioned above and capable of forming insoluble inorganic or organic salts with bases may also be employed, such as the succineins obtained by heating succinic anhydride with resorcinol.

Obviously the foregoing examples are simply illustrative and other particular compounds than those specifically mentioned may be employed without departing from the invention, which is to be limited only as set forth in the appended claims.

I claim:

1. A process for stimulating the growth of plants, consisting of applying to the medium surrounding the root system of the plant, a substance consisting of a substantially insoluble compound of a fluorescent dye.

2. The method of stimulating the growth of plants which comprises exposing to water reaching the roots of the plant a relatively insoluble compound, which upon hydrolysis yields a soluble fluorescent material.

3. A plant stimulant comprising essentially a relatively insoluble salt of a fluorescent dye which upon hydrolysis yields a soluble fluorescent material.

4. A plant stimulant comprising a relatively insoluble cupric salt of a fluorescent dye.

5. A plant stimulant comprising a relatively insoluble ferric salt of a fluorescent dye.

6. A plant stimulant comprising a relatively insoluble salt of a fluorescent dye with a base selected from the group consisting of cupric copper, ferric iron, maganous manganese, nickelous nickel.

7. A plant stimulant comprising a relatively insoluble salt of a fluorescent acid with an organic base.

8. A plant stimulant comprising a relatively insoluble compound of a fluorescent dye with a base that yields fluorescent salts whereby hydrolysis of the compound liberates both a fluorescent acid and a fluorescent base.

9. A plant stimulant comprising a relatively insoluble compound of fluorescent acid with a rhodamine base.

10. A plant stimulant comprising a relatively insoluble double salt formed by the reaction of a fluorescent acid, an organic base and an inorganic base.

11. A plant stimulant comprising a relatively insoluble compound of fluorescent acid with methylene blue and ferric iron.

12. A preparation for application to the medium surrounding the root system of a plant for stimulating the growth of the plant, and comprising a relatively insoluble compound of fluorescent acid with rhodamine B.

13. A process for stimulating the growth of plants, comprising applying to the medium surrounding the root system of the plant a substance comprising essentially a substantially insoluble compound of a fluorescent dye.

14. A plant stimulant comprising a relatively insoluble compound of a fluorescent dyestuff of the pyrone series and a soluble ferric salt.

15. A plant stimulant comprising a relatively insoluble compound of a fluorescent dyestuff of the pyrone series and ferric alum.

16. A plant stimulant comprising essentially a relatively insoluble salt of the fluorescent dye of the pyrone series which upon hydrolysis yields a soluble ferric material.

17. A plant stimulant comprising a relatively insoluble salt of a fluorescent dye of the pyrone series with a base selected from the group consisting of cupric copper, ferric iron, manganous manganese, nickelous nickel.

18. A plant stimulant comprising a relatively insoluble salt of a fluorescent acid of the pyrone series with an organic base.

19. A plant stimulant comprising a relatively insoluble compound of a fluorescent dye of the pyrone series with a base that yields fluorescent salts whereby hydrolysis of the compound liberates both a fluorescent acid and a ferric base.

20. A plant stimulant comprising a relatively insoluble double salt formed by the reaction of a fluorescent acid of the pyrone series, an organic base and an inorganic base.

21. A process for stimulating the growth of plants comprising, applying to the medium surrounding the root system of the plant a substance comprising essentially a substantially insoluble compound of a fluorescent dye of the pyrone series.

ARTHUR GEORGE GREEN.